B. R. ALAM.
CULTIVATOR ATTACHMENT.
APPLICATION FILED MAR. 15, 1917.
1,266,542. Patented May 21, 1918.
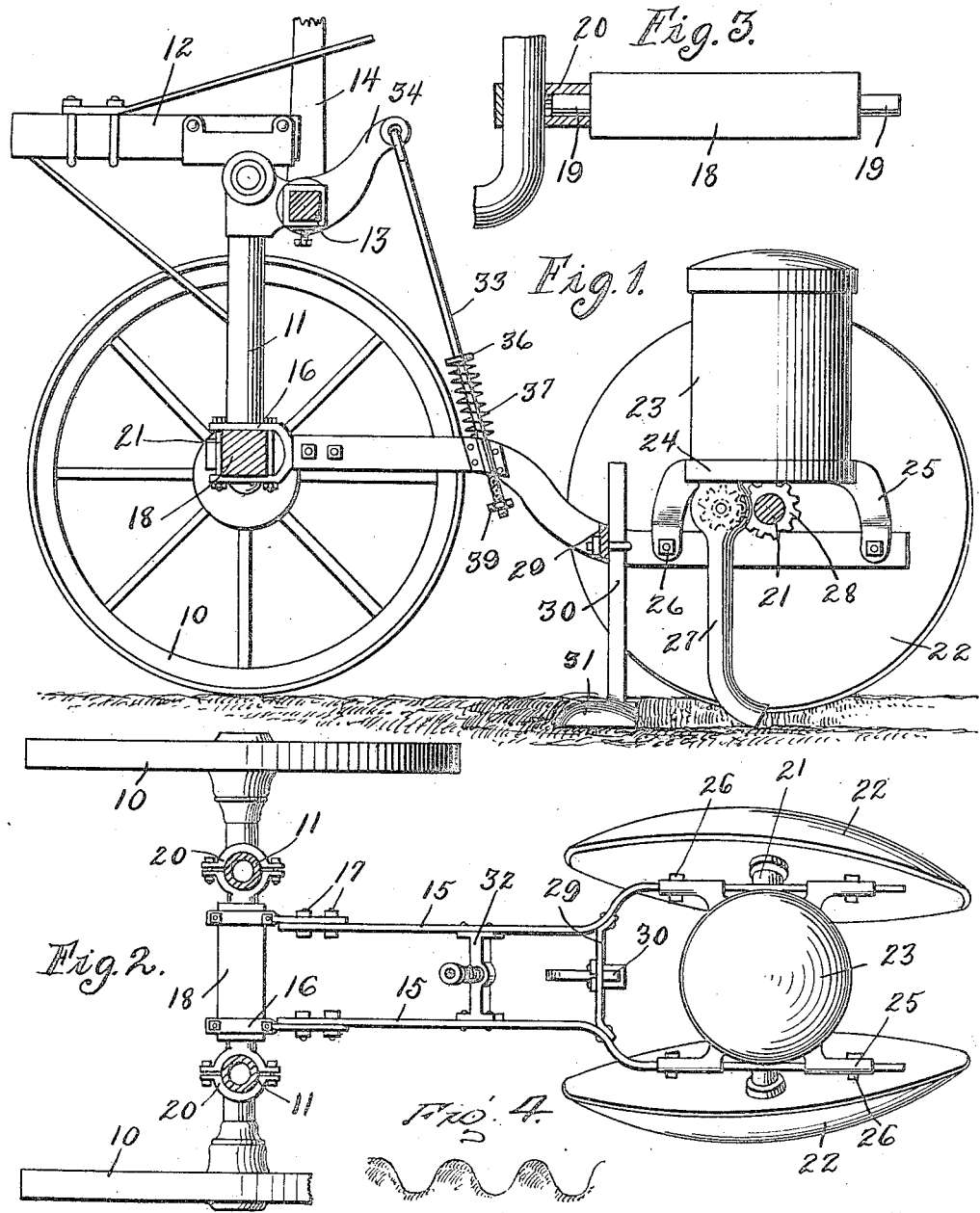
WITNESSES
INVENTOR
Bert R Alam
BY
ATTORNEY

UNITED STATES PATENT OFFICE.

BERT R. ALAM, OF WINNEBAGO, NEBRASKA.

CULTIVATOR ATTACHMENT.

1,266,542. Specification of Letters Patent. Patented May 21, 1918.

Application filed March 15, 1917. Serial No. 155,055.

*To all whom it may concern:*

Be it known that I, BERT R. ALAM, a citizen of the United States, residing at Winnebago, in the county of Thurston and State of Nebraska, have invented certain new and useful Improvements in Cultivator Attachments, of which the following is a specification.

This invention has relation to agricultural machines, and has special reference to a seed planting attachment for cultivators.

An object of the invention is to provide a seed planting attachment for cultivators whereby corn may be planted without the necessity of a check row wire, or other marking arrangement, and whereby the corn may be planted in such a manner as to facilitate its growth and to insure the production of vigorous plants.

A still further object of the invention is to provide an attachment which may be associated with any standard cultivator, and including disks utilizable conjunctively to cultivate the soil, and to operate seed dropping mechanism.

A still further object of the invention is to provide a seed planting attachment for cultivators and means whereby the attachment may be raised from the ground when not in use or may be applied and held in engagement with the ground resiliently to insure the planting of seed at a proper depth.

In addition to the foregoing my invention comprehends improvements in the details of construction and arrangement of parts to be hereinafter more fully described and particularly set forth in the appended claims.

In the accompanying drawings in which similar and corresponding parts are designated by the same characters of reference throughout the several views in which they appear:

Figure 1, is a view in section of a portion of a frame of a cultivator, illustrating the attachment thereto of my invention.

Fig. 2, is a view in plan of the attachment and a portion of the cultivator with which it is associated, Fig. 3, is a detail view illustrating a device whereby the attachment is secured to a part of the cultivator, and Figs. 4 and 5 are diagrammatic views illustrating the method of planting used in connection with my invention.

The primary object in applying my attachment to cultivators is to improve present planting methods, with special reference to planting of corn. The two methods at present widely prevailing, are checking and drilling. Corn planted by the first process lies close to the surface of the soil and is subject to the action of the atmosphere whereby the seeds are rapidly dried out. When corn is planted by listing, the seed is embedded to a greater depth below the surface of the earth, but if seed planted by this method is laid in the early spring, the plants are apt to be stunted thereby resulting in a poor and late crop. Furthermore listed corn when planted on a hill is very apt to be washed out by the rain.

My improved attachment for cultivators, permits of planting in such a manner as to obviate the above mentioned difficulties, and preliminary to using the attachment the ground is listed with an ordinary type of lister, preferably in the early spring. As a result furrows are formed as indicated in the diagrammatic view of Fig. 4. When the time for planting arrives, the ground is again traversed with the cultivator and my improvement which will now be described.

With reference to Figs. 1 and 2 of the drawings, 10 indicates the ground wheels which are mounted upon horizontal portions of an arched axle the vertical members of which are indicated at 11. A tongue 12 is provided whereby the cultivator may be drawn, and a squared shaft 13 is disposed parallel to the main frame of the cultivator (not shown), a lever 14 being secured to said shaft whereby it may be rotated to lift or depress the various listers and other cultivator implements associated with the conventional type of wheeled cultivator.

My improvement comprises a frame formed of parallel bars 15 having at their forward ends bifurcated members 16 which may be secured to the bars through the medium of bolts or the like 17. The bifurcated connecting members 16 are adapted to be secured to the arched axle of the cultivator by means of a connecting device formed for the purpose and which comprises a shaft 18, rectangular in cross sections and which is disposed between the vertical members 11 of the arched axle. The squared shaft 18 is provided at either end with reduced rounded portions 19 which are adapted to enter recesses formed in split clamps 20 which are embraced about said vertical members 11 of the arched axle. In this manner the squared shaft 18 is disposed transversely of the cultivator and horizontally, the bifurcated member 16 embracing said squared portion. Each member 16 is provided with apertures whereby bolts 21 may be inserted therethrough to engage the front and rear sides of the said portion of the shaft 18 as clearly set forth in Fig. 1 of the drawings.

From the foregoing it will be noted that the frame bars 15 may be oscillated vertically, the rectangular shaft 18 rotating in the bearing formed by the clamps 20.

The opposite ends of the bars 15 are spaced apart and an axle 21 is mounted thereon to extend transversely of the bars to support at either end a cultivator disk 22. It will be noted that the disks are disposed in planes which diverge upwardly, and which converge rearwardly as will be noted from Fig. 2 of the drawings.

A seed box 23 is disposed between the disks and is mounted upon an annular frame 24 having four lugs 25 which are bifurcated to straddle the bars 15, bolts 26 being inserted through the bifurcated portions, and apertures in the bars to secure the frame in place. A seed tube 27 depends from the seed box, and is adapted to contain at its upper end seed dropping mechanism which will not be illustrated in detail, but which will be of the conventional construction adapted to be operated through the medium of a spur gear 28 mounted upon the axle 21 whereby rotation of disks 22 may be imparted to the seed dropping mechanism to actuate the same at predetermined intervals.

A transverse bar 29 is supported at either end between the bars 15, and the standard 30 of a sub soil plow 31 is releasably and adjustably secured to said bar 29 whereby the standard and plow may be adjusted vertically to penetrate the earth to the desired depth.

A bar 32 is supported between the bars 15 and is formed with a central aperture through which a rod 33 is passed, the upper end of the rod being connected to an arm 34 which is mounted upon the above mentioned rectangular shaft 13 of the cultivator frame. The rod 33 carries a washer 36 above the bar 15, and the spring 37 is interposed between said washer and the bar 32 whereby the planting device may be resiliently held in engagement with the ground. A nut 39 may be applied to the lower end of the rod 33 whereby when the rectangular shaft is rotated, the arms 34 may be oscillated to draw upon the rod 33 and thereby raise the planting device in an obvious manner.

When corn is to be planted, the cultivator is drawn over the previously listed field with my improved planting attachment associated therewith, and the lister plows of the cultivator are caused to enter and pass through the previously listed furrow to again open the same. The first listing operation would have the effect to open the earth to permit the surface thereof to become warm before the seed is planted. The second listing operation recultivates the earth and places it in condition to receive the seed. Owing to the fact that the cultivator disks 22 of my improved attachment are caused to enter and pass through the listed furrows, and owing to the relative relation of the said disks 22, the furrows are further widened by said disks as shown in the diagrammatic view of Fig. 5 and the sub soil plow 31 moving beneath the surface of the ground at the bottom of the furrow, opens the ground sufficiently to permit the ejectment of seed from the seed tube thereinto at uniformly spaced intervals. The disks 22 thus act to throw a portion of the hill at each side of the furrow into the furrow created by the sub soil plow 31 whereby to cover up the seed. It will thus be seen that the seed may be planted to any depth desired thereby insuring vigorous growth of the plants and their appearance above the ground when the season has advanced sufficiently to promote their growth. Owing to the formation of a hill at each side of the row of planted corn, the possibility of washing the seed out is considerably reduced when the corn is planted on a hill. The ridges of earth at each side of the seed also promote the absorption of moisture by the ground thereby retaining the ground around the seed in a moist condition. Other advantages will be obvious to those conversant with the art to which this invention appertains.

While I have illustrated and described my invention with some degree of particularity, I realize that in practice various alterations thereover may be made, and I therefore desire to reserve the right and privilege of changing the form of the details of construction, or otherwise altering the arrangement of the correlated parts without departing from the spirit of the invention or the scope of the appended claims.

Having thus described my invention what I claim as new and desire to secure by Letters Patent is:—

1. In a lister cultivator having an arched axle, the combination of a seed planting attachment including a frame, formed of spaced bars, a shaft, means for supporting the shaft for rotation between the members of the arched axle, means for securing the said frame bars to said shaft, whereby the frame bars may be oscillated vertically to raise the attachment from the ground, cultivator disks journaled on said frame, a sub soil plow mounted on the frame, and means operable by rotation of said cultivator disks for depositing seed in the soil formed by said sub soil plow.

2. In a lister cultivator having an arched axle formed with a pair of spaced vertical members, the combination of a seed planting attachment including a frame formed of spaced bars, a shaft rectangular in cross section having reduced cylindrical terminals, a pair of clamps, one embraced about each vertical member of the axle, whereby the shaft is mounted for rotation, means connecting the adjacent terminals of said frame bars to said shaft whereby the frame may be raised vertically, manually operable means mounted on the cultivator for raising said frame, cultivator disks mounted for rotation on the frame, and a sub soil plow mounted on the frame, and means operable by rotation of said cultivator disks for depositing seed in the furrow formed by said plow.

In testimony whereof I affix my signature in presence of two witnesses.

BERT R. ALAM.

Witnesses:
ERLE K. WILTSE,
E. E. PROCHASKA.

Copies of this patent may be obtained for five cents each, by addressing the "Commissioner of Patents, Washington, D. C."